United States Patent
Shutty et al.

(10) Patent No.: US 9,551,286 B2
(45) Date of Patent: Jan. 24, 2017

(54) TURBOCHARGER BOOST CONTROL USING EXHAUST PRESSURE ESTIMATED FROM ENGINE CYLINDER PRESSURE

(75) Inventors: John Shutty, Clarkston, MI (US); Wolfgang Wenzel, Stuttgart (DE)

(73) Assignee: BorgWarner Inc., Auburn Hills, MI (US)

( * ) Notice: Subject to any disclaimer, the term of this patent is extended or adjusted under 35 U.S.C. 154(b) by 383 days.

(21) Appl. No.: 14/009,357

(22) PCT Filed: Apr. 19, 2012

(86) PCT No.: PCT/US2012/034195
§ 371 (c)(1),
(2), (4) Date: Feb. 25, 2014

(87) PCT Pub. No.: WO2012/145476
PCT Pub. Date: Oct. 26, 2012

(65) Prior Publication Data
US 2014/0196704 A1 Jul. 17, 2014

Related U.S. Application Data

(60) Provisional application No. 61/478,125, filed on Apr. 22, 2011.

(51) Int. Cl.
*F02D 41/00* (2006.01)
*F02B 37/18* (2006.01)
*F02D 35/02* (2006.01)
*F02D 41/14* (2006.01)

(52) U.S. Cl.
CPC ........... *F02D 41/0007* (2013.01); *F02B 37/18* (2013.01); *F02D 35/023* (2013.01); *F02D 41/145* (2013.01); *F02D 2041/141* (2013.01); *F02D 2041/1419* (2013.01); *F02D 2200/0406* (2013.01); *F02M 26/05* (2016.02); *F02M 26/25* (2016.02); *Y02T 10/144* (2013.01)

(58) Field of Classification Search
USPC .............. 123/435, 559.1, 676; 701/108, 111; 73/114.76; 60/605.1, 605.2
See application file for complete search history.

(56) References Cited

U.S. PATENT DOCUMENTS 5,960,631 A * 10/1999 Hayashi ................. F02B 37/18
60/602
5,967,115 A   10/1999 Konopka et al.
6,018,948 A   2/2000 Schnaibel et al.
(Continued)

FOREIGN PATENT DOCUMENTS

CN  101010500 A  8/2007
FR  EP 1607605 A1 * 12/2005  ........... F02D 35/023
(Continued)

OTHER PUBLICATIONS

Chinese Office Action dated Jun. 2, 2015 ; Application No. 201280017797.5 ; Applicant: BorgWarner Inc. ; 12 pages.
(Continued)

*Primary Examiner* — Stephen K Cronin
*Assistant Examiner* — Kevin R Steckbauer
(74) *Attorney, Agent, or Firm* — BrooksGroup (57) ABSTRACT

Controlling turbocharger boost pressure using exhaust pressure estimated from engine cylinder pressure.

11 Claims, 3 Drawing Sheets

(56) References Cited

U.S. PATENT DOCUMENTS

| | | | | |
|---|---|---|---|---|
| 6,076,352 | A * | 6/2000 | Hayashi | F02B 37/18 60/602 |
| 6,148,615 | A | 11/2000 | Vogt et al. | |
| 6,253,551 | B1 | 7/2001 | Lohmann et al. | |
| 6,662,562 | B2 * | 12/2003 | Engel | F02B 37/24 60/602 |
| 6,672,060 | B1 * | 1/2004 | Buckland | F02D 23/005 123/564 |
| 6,820,592 | B2 | 11/2004 | Buck et al. | |
| 6,985,808 | B1 * | 1/2006 | Kennedy | F02D 41/0007 123/568.21 |
| 7,076,955 | B2 | 7/2006 | Herz et al. | |
| 7,516,618 | B2 * | 4/2009 | Rouphael | F02B 37/18 123/672 |
| 7,540,148 | B2 | 6/2009 | Wild et al. | |
| 8,055,436 | B2 * | 11/2011 | Panciroli | F02D 41/0007 123/568.11 |
| 8,209,979 | B2 * | 7/2012 | Wang | F02B 37/004 60/600 |
| 8,443,601 | B2 * | 5/2013 | Panciroli | F02D 41/1402 123/478 |
| 8,515,647 | B2 * | 8/2013 | Panciroli | F02D 41/0007 60/602 |
| 8,567,192 | B2 * | 10/2013 | Chi | F02B 37/18 123/562 |
| 8,621,864 | B2 * | 1/2014 | Osburn | F02D 41/0007 123/568.26 |
| 8,783,030 | B2 * | 7/2014 | Chi | F02B 37/04 123/568.12 |
| 9,181,905 | B2 * | 11/2015 | Chi | F02D 41/0065 |
| 2003/0010019 | A1 | 1/2003 | Engel | F02B 37/24 60/285 |
| 2006/0225418 | A1 | 10/2006 | Kishimoto et al. | |
| 2010/0242470 | A1 * | 9/2010 | Wang | F02B 37/004 60/602 |
| 2011/0088388 | A1 * | 4/2011 | Panciroli | F02D 41/0007 60/602 |
| 2011/0088389 | A1 * | 4/2011 | Panciroli | F02D 41/1402 60/602 |
| 2011/0088390 | A1 * | 4/2011 | Panciroli | F02D 41/0007 60/602 |
| 2011/0125427 | A1 * | 5/2011 | Tugnolo | F02D 35/023 702/50 |
| 2011/0154820 | A1 * | 6/2011 | Osburn | F02D 41/0007 60/605.2 |
| 2011/0225967 | A1 * | 9/2011 | Karnik | F02B 37/16 60/602 |
| 2013/0074492 | A1 * | 3/2013 | Chi | F02B 37/18 60/602 |
| 2013/0074495 | A1 * | 3/2013 | Chi | F02B 37/10 60/605.2 |
| 2013/0074496 | A1 * | 3/2013 | Chi | F02B 37/04 60/605.2 |
| 2013/0080034 | A1 * | 3/2013 | Chi | F02D 41/0065 701/108 |
| 2014/0196704 | A1 * | 7/2014 | Shutty | F02D 35/023 123/676 |
| 2014/0345255 | A1 * | 11/2014 | Zhu | F02B 37/22 60/273 |
| 2016/0131089 | A1 * | 5/2016 | Lahti | F02M 25/0753 60/605.2 |
| 2016/0146130 | A1 * | 5/2016 | Haskara | F02D 41/005 701/108 |

FOREIGN PATENT DOCUMENTS

| | | |
|---|---|---|
| WO | 9611326 A1 | 4/1996 |
| WO | 2004048761 A1 | 6/2004 |

OTHER PUBLICATIONS

International Search Report and Written Opinion ; date of mailing Nov. 16, 2012 ; International Application No. PCT/US2012/034195 ; 9 pages.

* cited by examiner

Figure 1:
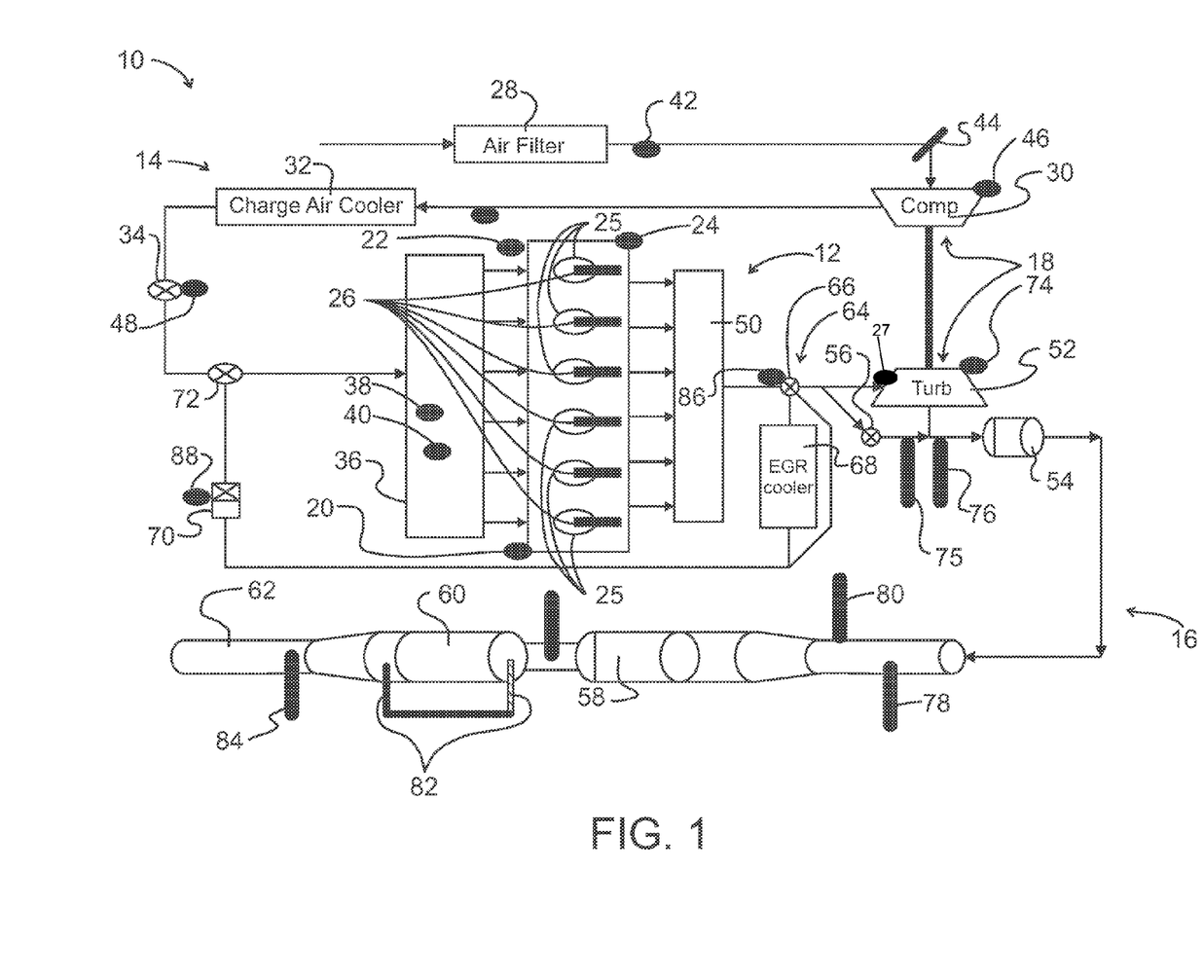
FIG. 1 illustrates an embodiment of an internal combustion engine system with a multitude of sensors.

FIG. 3 ize power. Further, the system 10 may include an exhaust gas recirculation (EGR) system 20, and various sensors to detect various engine operating parameters as will be described below.

TURBOCHARGER BOOST CONTROL USING EXHAUST PRESSURE ESTIMATED FROM ENGINE CYLINDER PRESSURE

CROSS REFERENCE TO RELATED APPLICATIONS

This application claims the benefit of the filing date of U.S. Provisional Application Ser. No. 61/478,125 filed Apr. 22, 2011.

TECHNICAL FIELD

The field to which the disclosure generally relates includes engine control and diagnostics using measurements of engine cylinder pressure.

BACKGROUND

An internal combustion engine includes engine cylinders and may include pressure sensors in communication with the cylinders to measure combustion pressure within those cylinders.

SUMMARY OF ILLUSTRATIVE EMBODIMENTS OF THE INVENTION

One embodiment of a method includes sensing pressure within an engine cylinder, estimating exhaust pressure based on the pressure within the engine cylinder, and controlling turbocharger boost pressure based on the estimated exhaust pressure.

Another embodiment of a method of designing an engine system includes providing an engine system including one or more engine cylinder pressure sensors and one or more other engine system sensors; operating the engine system; sensing engine cylinder pressure using the engine cylinder pressure sensors, which are in communication with an engine cylinder of an engine of the engine system; sensing exhaust pressure at a turbocharger turbine inlet using the other engine system sensors; correlating the engine cylinder pressure to the exhaust pressure; and using engine cylinder pressure to replace or augment the exhaust pressure.

Yet another embodiment of a method includes determining a boost pressure deviation between a boost pressure setpoint and an actual boost pressure, producing a closed-loop exhaust pressure setpoint adjustment in response to the boost pressure deviation, and producing an open-loop exhaust pressure setpoint from inputs of the boost pressure setpoint and an exhaust gas recirculation parameter. The method also includes combining the closed-loop exhaust pressure setpoint adjustment with the open-loop exhaust pressure setpoint to produce an exhaust pressure setpoint, and determining an exhaust pressure deviation between the exhaust pressure setpoint and an exhaust pressure estimate that is estimated from actual cylinder pressure. The method further includes producing a closed-loop turbocharger command adjustment in response to the exhaust pressure deviation, producing an open-loop turbocharger command from an input of the exhaust pressure setpoint, and combining the closed-loop turbocharger command adjustment with the open-loop turbocharger command to produce a turbocharger command.

An additional embodiment of a method includes determining a boost pressure deviation between a boost pressure setpoint and an actual boost pressure, and producing an exhaust pressure setpoint in response to the boost pressure deviation. The method also includes determining an exhaust pressure deviation between the exhaust pressure setpoint and an exhaust pressure estimate that is estimated from actual cylinder pressure, and producing a turbocharger command in response to the exhaust pressure deviation.

A further embodiment of a computer program product includes a computer-readable medium including instructions executable by a computer-controlled engine system to cause the system to implement a method according to any one of the preceding method embodiments.

Another embodiment may include a product including at least one engine cylinder pressure sensor to measure engine cylinder pressure, and at least one turbocharger boost pressure sensor to measure turbocharger boost pressure. The product also includes at least one memory device storing program instructions and data, and at least one control system coupled to the sensors and memory and responsive to the program instructions for causing the computer-controlled system to perform a method according to any one of the preceding method embodiments.

Other illustrative embodiments of the present invention will become apparent from the detailed description provided hereinafter. It should be understood that the detailed description and specific examples, while disclosing illustrative embodiments of the invention, are intended for purposes of illustration only and are not intended to limit the scope of the invention.

BRIEF DESCRIPTION OF THE DRAWINGS

Illustrative embodiments of the present invention will become more fully understood from the detailed description and the accompanying drawings, wherein.

DETAILED DESCRIPTION OF ILLUSTRATIVE EMBODIMENTS

The following description of the embodiments is merely illustrative in nature and is in no way intended to limit the invention, its application, or uses.

According to a first embodiment of a method, pressure is sensed within an engine cylinder, and at least one other engine system parameter is estimated based on the sensed pressure. In other words, engine cylinder pressure may be used as a proxy for other engine system parameters. Therefore, sensors for the other engine system parameters may be omitted or at least diagnosed using cylinder pressure data. Cylinder pressure data may also be used to diagnose engine system components for failure, damage, corrosion and the like.

Referring now to FIG. 1, the method may be used in conjunction with an internal combustion engine system 10. In general, the system 10 includes an internal combustion engine 12 to develop mechanical power from combustion of a mixture of air and fuel, an intake or aspiration system 14 to provide air to the engine 12, and an exhaust system 16 to convey combustion gases generally away from the engine 12. Also, the system 10 may include a turbocharger 18 in communication across the aspiration and exhaust systems 14, 16 to compress air for combustion to increase engine output. The turbocharger 18 may be a variable geometry turbine type of turbocharger. Those skilled in the art will recognize that a fuel system (not shown) may be used to provide fuel to the engine, and that a controller (not shown) may include one or more suitable processors and memory to carry out at least some portions of the methods disclosed herein.

The internal combustion engine 12 may be any suitable type of engine, such as an autoignition engine like a diesel engine. The internal combustion engine 12 may use any type of suitable liquid or gaseous fuel. The engine 12 includes cylinders 25 and pistons in a block (not separately shown) that, along with a cylinder head (not separately shown), define combustion chambers (not shown). The engine 12 may also include several sensors. For example, an oil pressure sensor 20 may be provided in the block to measure engine oil pressure, as well as an engine speed and/or position sensor 22 to measure the rotational speed and/or position of an engine crankshaft (not shown). Also, a coolant temperature sensor 24 may be provided in the block to measure the temperature of engine coolant flowing therethrough.

The engine 12 may include a number of engine cylinder pressure sensors 26 in communication with the engine cylinders 25 to measure pressure therein. The pressure sensors 26 may be located in immediate communication with the engine cylinders 25, such as for estimating parameters related to the engine's combustion curve. The engine cylinder pressure sensors 26 may be separate devices or may be integrated into other devices, such as glow plugs.

Also, the pressure sensors 26 may be located in upstream or downstream communication with the engine cylinders 25, such as for estimating parameters related to the engine's gas exchange pressure curve (e.g. during opening of intake and exhaust valves). For example, the pressure sensors 26 may be placed in upstream communication in any suitable location in the aspiration system 14, such as in communication with the intake manifold 36. In another example, the pressure sensors 26 may be placed in downstream communication in any suitable location in the exhaust system 16, such as in communication with the exhaust manifold 50.

Although the cylinder pressure sensors 26 may be used in accordance with the methods described herein, typically they have been used to enhance engine system control and/or diagnostics. As will be described further herein below, the methods described herein take advantage of the existence of these cylinder pressure sensors 26 to estimate various other engine system parameters, such as parameters that are normally measured or assessed using other dedicated engine sensors.

The aspiration system 14 may include, in addition to suitable conduit and connectors, an air filter 28 to filter incoming air, a turbocharger compressor 30 to compress the filtered air, an intercooler 32 to cool the compressed air, and a throttle valve 34 to throttle the flow of the cooled air. The aspiration system 14 may also include an intake manifold 36 to receive the throttled air and distribute it to the combustion chambers of the engine 12.

The aspiration system 14 may also include a number of sensors. For example, an intake manifold pressure sensor 38 may be provided in communication with the intake manifold 36 to measure the pressure of air flowing to the engine cylinders 25, and a temperature sensor 40 to measure the temperature of air flowing to the cylinders 25. A mass air flow sensor 42 and ambient temperature sensor 44 may be placed downstream of the air filter 28 and upstream of the turbocharger compressor 30. A speed sensor 46 may be suitably coupled to the turbocharger compressor 30 to measure the rotational speed thereof. A throttle position sensor 48, such as an integrated angular position sensor, may be used to measure the position of the throttle valve 34.

The exhaust system 16 may include, in addition to suitable conduit and connectors, an exhaust manifold 50 to collect exhaust gases from the combustion chambers of the engine 12 and convey them downstream to the rest of the exhaust system 16. The exhaust system 16 may also include a turbocharger turbine 52 in downstream communication with the exhaust manifold 50, a catalytic converter 54 such as a close-coupled diesel oxidation catalyst (DOC) device, and a turbo wastegate valve 56 to control bypass of exhaust gases around the turbocharger turbine 52 to the DOC unit. Also, the exhaust system 16 may include a nitrogen oxide (NOx) adsorber unit 58 upstream of a soot filter 60, which may be upstream of an exhaust tailpipe 62.

Additionally, the exhaust and/or aspiration system(s) 16, 14 may include an exhaust gas recirculation (EGR) apparatus 64 to recirculate exhaust gas from the exhaust manifold 50 of the engine 12 to the intake manifold 36 of the engine 12. The EGR apparatus 64 may include an EGR cooler bypass valve 66 in downstream communication with the exhaust manifold 50 to control recirculation of exhaust gases back to the intake manifold 36, an EGR cooler 68 downstream of the EGR cooler bypass valve 66 to cool EGR gases, and an EGR valve 70 to control flow of the EGR gases. The EGR apparatus 64 may also include an EGR mixing unit 72 in communication with the EGR valve 70 at a location downstream of the throttle valve 34 and upstream of the intake manifold 36 to mix EGR gases with the throttled air.

The exhaust system 16 may further include a number of sensors. An exhaust pressure sensor 27 may be placed just upstream of a turbocharger turbine inlet to measure exhaust pressure. A position sensor 74 may be disposed in proximity to the turbocharger 18 to measure the position of the variable geometry turbine, and a NOx sensor 75 may be placed downstream of the turbine 52. Temperature sensors 76, 78 may be placed upstream and downstream of the catalytic converter 54 to measure the temperature of exhaust gases at the inlet and outlet of the catalytic converter 54. An oxygen ($O_2$) sensor 80 may be placed upstream of the adsorber unit 58 to measure oxygen in the exhaust gases. One or more pressure sensors 82 may be placed across the soot filter 60 to measure the pressure drop thereacross. A tailpipe temperature sensor 84 may be placed just upstream of a tailpipe outlet to measure the temperature of the exhaust gases exiting the exhaust system 16. Finally, a position sensor 86 may be used to measure the position of the EGR cooler bypass valve 66, and another position sensor 88 may be used to measure the position of the EGR valve 70.

In addition to the sensors shown and discussed herein, any other suitable sensors and their associated parameters may be encompassed by the presently disclosed methods. For example, the sensors could also include accelerator pedal sensors, vehicle speed sensors, powertrain speed sensors, filter sensors, flow sensors, vibration sensors, knock sensors, intake and exhaust pressure sensors, turbocharger speed and noise sensors, and/or the like. Moreover, other engine system parameters may be encompassed by the presently disclosed methods including turbocharger efficiency, component fouling or balancing problems, filter loading, Diesel Particulate Filter (DPF) regeneration status, EGR rate, high pressure (HP) and low pressure (LP) EGR fraction or ratio, cylinder charge mal-distribution, and/or the like. In other words, any sensors may be used to sense any suitable physical parameters including electrical, mechanical, and/or chemical parameters. As used herein, the term sensor includes any suitable hardware and/or software used to sense any engine system parameter.

Also, as used herein, HP EGR may include a high pressure exhaust gas recirculation path between exhaust and induction subsystems upstream of a turbocharger turbine and downstream of a turbocharger compressor, and LP EGR may include a low pressure exhaust gas recirculation path between exhaust and induction subsystems downstream of the turbocharger turbine and upstream of the turbocharger compressor. A target total EGR fraction may be determined for compliance with exhaust emissions criteria, and a target HP/LP EGR ratio may be determined to optimize other engine system criteria within the constraints of the determined target total EGR fraction.

The estimated parameters may be quantitative, qualitative, and/or existential in nature. More specifically, numerical parameter values may be estimated, qualitative parameters may be estimated such as component malfunction, and existential parameters may be estimated such as absence or presence of components or of authentic components. Also, values of the parameters may be absolute or relative numerical values, values that indicate absence or presence such as 0 or 1, or any suitable indications for a parameter of any kind.

According to another embodiment, a method is provided for designing an engine system. According to the method, an engine system may be provided and includes one or more engine cylinder pressure sensors and one or more other engine system sensors. For example, the above-described engine system 10 could be used. Next, the engine system may be operated. For example, the engine system may be operated in an instrumented vehicle on a vehicle test track, on a dynamometer, in an emissions test laboratory, and/or the like. During engine system operation, cylinder pressure may be sensed using engine cylinder pressure sensors in communication with engine cylinders of an engine of the engine system. Then, other engine system parameters may be sensed using the other engine system sensors. Values for any or all of the sensed parameters may be stored in any suitable manner for subsequent data analysis.

The parameters may be analyzed or evaluated to correlate engine cylinder pressure to other engine system parameter. Such correlation may be carried out in any suitable fashion. For example, cylinder pressure may be formulaically related to the other engine system parameters. In another example, cylinder pressure may be directly or indirectly related to the other engine system parameters. In any case, where cylinder pressure is found to reliably correlate to any other engine system parameter, that correlation may be modeled formulaically, empirically, acoustically, and/or the like. For example, empirical models may be developed from suitable testing and can include lookup tables, maps, and the like that may cross reference cylinder pressure with other engine system parameters.

Accordingly, engine cylinder pressure measurements are used as a proxy for and, thus, to replace or augment measurements of, other engine system parameters that correlate to engine cylinder pressure. Although cylinder pressure at any given moment during engine operation may be measured, one preferred aspect includes using non-combustion cylinder pressure measurements such as pre-combustion and/or post-combustion pressure. More particularly, engine cylinder pressure may be sensed just before combustion, but substantially when compression is complete, for use with engine system parameters that correlate with such cylinder pressure.

In a first example, the other engine system parameter may be a position of a mechanical device such as a valve. More particularly, the mechanical device position may be variable geometry turbine position, which may be proportional to intake manifold pressure and may be formulaically evaluated or estimated based on engine cylinder pressure using the following equation:

$$P_{cyl} = P_{intake} * CR^k = P_{intake} * \left(\frac{V_s + V_{cc}}{V_{cc}}\right)^k$$

where:
$P_{cyl}$=cylinder pressure before combustion, after compression [Pa];
$P_{intake}$=intake manifold pressure [Pa];
CR=compression ratio=$(V_s+V_{cc})/V_{cc}$ [dimensionless], wherein $V_s$, $V_{cc}$=swept volume, and clearance volume [m³]; and
k=ratio of specific heat of air [dimensionless].

In a second example, engine system parameters may be estimated based on engine system acoustics. More particularly, the frequency content of the cylinder pressure sensor signals may be analyzed or evaluated to estimate the other engine system parameters. For example, the frequency spectrum of the cylinder pressure sensor signals or portions thereof may be analyzed to determine the position of a mechanical valve using Fourier analysis, Laplace analysis, Wavelet analysis, and/or the like. Also, such preprocessing may be coupled with, for example, model-based or artificial intelligence approaches like neural networks to evaluate relationships between sensed engine cylinder pressure and at least one other engine system parameter.

Many engine system sub-systems and components may be designed to be easily monitored by their acoustic response behavior, and such acoustic responses may be analyzed and may include acoustic signatures. In fact, engine system components may be designed to exhibit a particular acoustic signature, which the cylinder pressure sensor(s) may be designed to recognize. The acoustic signature may include one or more of amplitude, frequency, or transient characteristics. It is also contemplated that cylinder pressure sensor signals may be used to recognize changes of the acoustic signatures of the sub-systems and components and therefore detect status changes. For example, frequency analysis of cylinder pressure waves could be used to identify counterfeit sub-systems and components, or to determine when a sub-system or component is malfunctioning or is broken. Moreover, such frequency analysis may be used to sense any changes in geometry in an aspiration or exhaust system in terms of actuation, fouling, and damage.

In another embodiment, a pressure sensor or any other acoustic measuring device which is suited to monitor pressure may be placed elsewhere on or in various engine system components (e.g. in the intake or exhaust path) or in the engine compartment to estimate various engine system parameters. In other words, the cylinder pressure sensors may be replaced or supplemented with pressure sensors upstream or downstream of the cylinders.

In a third example, the other engine system parameter may be a fluid condition. More particularly, the fluid condition may be temperature of air in an engine intake manifold, which is related to cylinder pressure and is formulaically estimated using the following equations:

$$T_{before\_combustion} = T_{intake\_air} * CR^{k-1}$$

where $$PV = mRT_{before\_combustion} \text{ and } \rho = \frac{m}{V} \text{ so,}$$

$$\rho = \frac{P}{RT_{before\_combustion}} = \rho_{before\_combustion}$$

where:
CR=compression ratio;
k=ratio of specific heat of air;
R=air specific gas constant [kJ/(kg*K)];
P=combustion chamber pressure [kPa];
V=cylinder clearance volume [m³];
ρ=air density [kg/m³]; and
T=combustion chamber temperature [K].

According to the above, the engine cylinder pressure sensors may be used as a check on certain other engine system sensors such as for engine system diagnostics (e.g. On Board Diagnostics—OBD) or the like, or the engine cylinder pressure sensors may be used to omit those other engine system sensors altogether. In other words, engine cylinder pressure may be used not necessarily to improve engine performance, but rather to enhance reliability of measuring engine system parameters and/or eliminate costly sensors from the engine system, as depicted below in FIG. 2.

Figure 2:
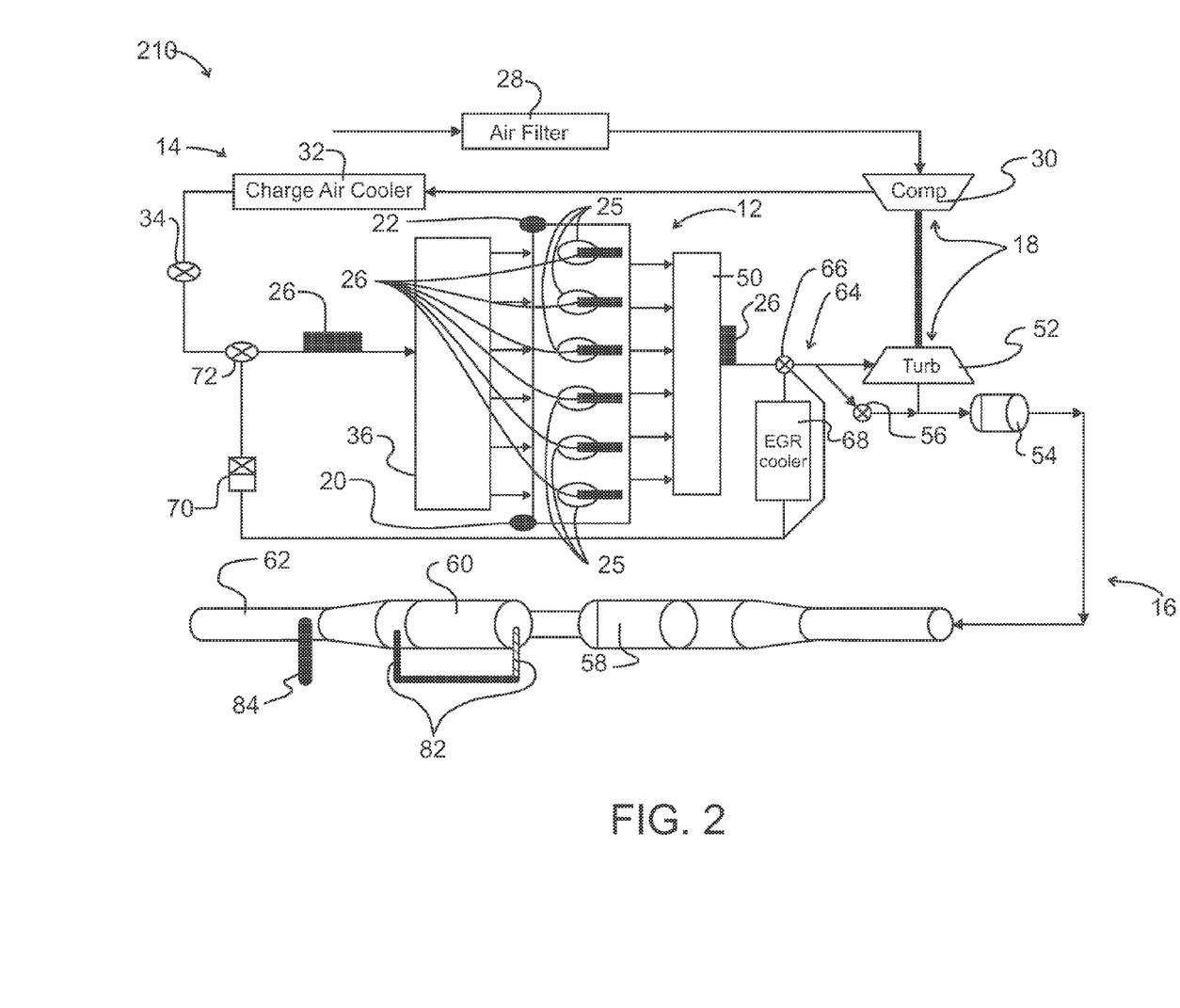
FIG. 2 illustrates another embodiment of an internal combustion engine system with fewer sensors than the embodiment of FIG. 1.

FIG. 2 illustrates another embodiment of an internal combustion engine system 210. This embodiment is similar in many respects to the embodiment of FIG. 1 and the description of the common subject matter generally may not be repeated here. In fact, the system 210 is nearly identical to the system 10 of FIG. 1, except many of the sensors of the FIG. 1 system 10 are omitted based on the above-described method. One difference includes pressure sensors 26, which instead of or in addition to the sensors 26 in direct communication with the engine cylinders 25, may be placed upstream and/or downstream of the engine cylinders 25 in the intake and/or exhaust system(s) 14, 16.

Accordingly, many sensors may be eliminated, thereby saving on their cost and weight. Alternatively, the sensors may be retained, and the cylinder pressure estimate of the sensors anticipated value may be used as a diagnostic on the other sensor. In this latter case, a direct piece part cost reduction is not achieved, however, simpler and more robust diagnostic algorithms may be used which can save development time and testing as well as engine controller memory and computing time.

In another embodiment of a method that may be carried out in the illustrative systems 10 and/or 210 of FIGS. 1 and/or 2, pressure within an engine cylinder is sensed, and exhaust pressure is estimated based on the sensed pressure. The exhaust pressure may be an estimate of exhaust pressure at an inlet of the turbocharger turbine 52. The exhaust pressure may be formulaically estimated using the following equation:

$$P_{exhaust} = f(P_{cyl\_max}, P_{cyl}(\theta), v)$$

where:
$P_{exhaust}$=exhaust manifold pressure [Pa];
$P_{cyl}$=cylinder pressure before combustion, after compression [Pa];
$P_{cyl\_max}$=maximum cylinder pressure over the current combustion cycle [Pa];
θ=exhaust valve opening angle (time could be substituted for θ);
$P_{cyl}(\theta)$=cylinder pressure when the engine is in the position where the exhaust valves are open; and
v=engine revolutions per minute.

Figure 3:
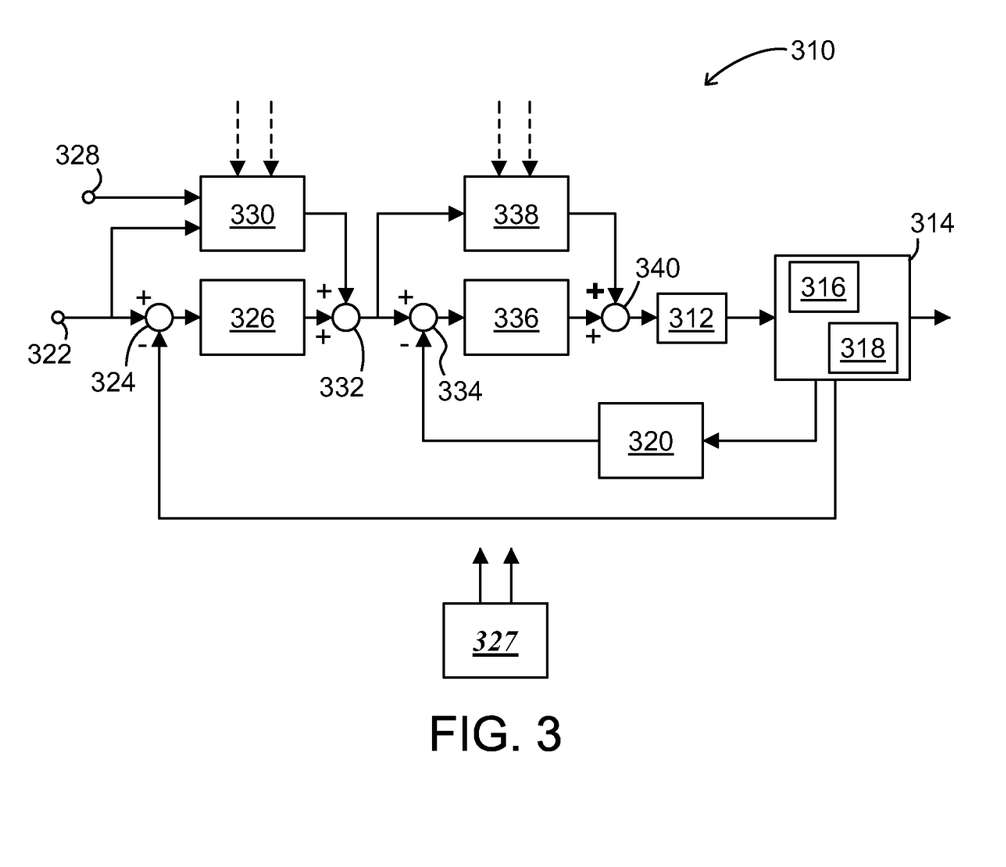
FIG. 3 illustrates an embodiment of a turbocharger boost control architecture.

FIG. 3 illustrates another illustrative embodiment of a turbocharger control system or architecture 310 that may be used wholly or partially to implement one or more turbocharger control methods. This embodiment is similar in many respects to the embodiment of FIGS. 1 and 2 and like numerals between the embodiments generally designate like or corresponding elements throughout the several views of the drawing figures. Additionally, the descriptions of the embodiments are incorporated by reference into one another and the common subject matter generally may not be repeated here.

The architecture 310 or method may include closed-loop control, or open-loop and closed-loop control, of a turbocharger device 312, which may be an actuator for variable geometry turbine, an inlet valve, a bypass or wastegate valve, or any other suitable device. The architecture also may include an engine 314 that may include one or more turbocharger boost pressure sensors 316 placed in any suitable location and one or more cylinder pressure sensors 318. The boost pressure sensor(s) 316 may produce one or more signals for actual boost pressure, and the cylinder pressure sensor(s) 318 may produce one or more signals for use as an exhaust pressure estimate 320. For example, the estimated exhaust pressure may be an estimate of exhaust pressure at a turbocharger turbine inlet. The exhaust pressure estimate 320 may be produced by a model, calculation, equation, formula, circuit, and/or any other suitable device, expedient, or the like.

The architecture 310 or method may include a boost pressure setpoint 322, a first arithmetic node 324 to produce a deviation between the setpoint 322 and the actual boost pressure from the sensor(s) 316, and a boost pressure closed-loop controller 326 that may produce a closed-loop exhaust pressure setpoint (or setpoint adjustment in the illustrative dual control embodiment) in response to the boost pressure deviation. The architecture 310 also may include an exhaust gas recirculation (EGR) parameter 328 and a boost pressure open-loop controller 330 that may produce an open-loop exhaust pressure setpoint in response to the boost pressure setpoint 322 and the EGR parameter 328. In an illustrative dual control embodiment, the open-loop controller 330 produces a base setpoint and the closed-loop controller 326 produces a setpoint adjustment to the base setpoint.

In one example, the EGR parameter 328 may include an EGR adjustment factor. For instance, the EGR adjustment factor may be used to adapt the open loop controller 330 based on a current or target total EGR fraction for the engine. This may be useful because EGR can affect the actual exhaust pressure necessary to achieve a given boost pressure setpoint. More specifically, the open loop controller 330 could be adjusted according to the EGR adjustment factor so that at higher (e.g. HP) EGR rates, the open loop exhaust pressure set-point would be higher for a given boost set-point, for example, to compensate for exhaust lost due to the HP EGR loop.

In a dual, open-loop and closed-loop, control embodiment, a second arithmetic node 332 may be used to receive the closed-loop exhaust pressure setpoint adjustment and the open-loop exhaust pressure setpoint from the controllers 326, 330 and produce an exhaust pressure setpoint. The node 332 may perform any suitable arithmetic operation on the setpoints like summing, superimposing, averaging, and/or any other suitable combination. In an illustrative closed-loop only embodiment, the node 332 is omitted and an exhaust pressure setpoint is fed downstream from the controller 326.

In another embodiment, a third arithmetic node 334 may receive an exhaust pressure setpoint from the controller 326 or the node 332 and the exhaust pressure estimate 320 and produce an exhaust pressure deviation that may be used as input to an exhaust pressure closed-loop controller 336. The closed-loop controller 336 may produce as output a closed-loop actuator position command or setpoint for the turbocharger device 312.

In an illustrative dual control embodiment, the exhaust pressure setpoint from the node 332 is input to an exhaust pressure open-loop controller 338 that, in response thereto, may produce as output an open-loop loop actuator position command or setpoint for the turbocharger device 312. In an illustrative dual control embodiment, the open-loop controller 338 produces a base setpoint and the closed-loop controller 336 produces a setpoint adjustment to the base setpoint.

Also in an illustrative dual control embodiment, a fourth arithmetic node 340 may be used to receive the closed-loop turbocharger command adjustment and the open-loop turbocharger command and produce a turbocharger command for input to the turbocharger device 312. The node 340 may perform any suitable arithmetic operation on the setpoints like summing, superimposing, averaging, and/or any other suitable combination. In an illustrative closed-loop only embodiment, the node 340 is omitted and a closed-loop turbocharger command is fed downstream from the controller 336 to the turbocharger device 312.

The closed-loop controllers 326, 336 may include one or more of proportional controllers, proportional-integral controllers, proportional-derivative controllers, proportional-integral-derivative controllers, or any other suitable types of controllers that may be separate, or integrated in one controller or on one processor in any suitable manner. The open-loop controllers 330, 338 may include one or more of system models, EGR models, exhaust models, or any other suitable models. As indicated by dashed arrows, the controllers 330, 338 may receive as additional input, one or more additional parameters of any suitable type.

The architecture 310 also may include one or more memory devices 327 that may be part of or coupled in any suitable manner to one or more of the controllers 326, 330, 336, 338.

According to an illustrative embodiment of turbocharger dual control, a method may include determining a boost pressure deviation between a boost pressure setpoint and an actual boost pressure, producing a closed-loop exhaust pressure setpoint adjustment in response to the boost pressure deviation, and producing an open-loop exhaust pressure setpoint from inputs of the boost pressure setpoint and an exhaust recirculation parameter. The method also may include combining the closed-loop exhaust pressure setpoint adjustment with the open-loop exhaust pressure setpoint to produce an exhaust pressure setpoint, and determining an exhaust pressure deviation between the exhaust pressure setpoint and an exhaust pressure estimate that is estimated from actual cylinder pressure. The method further may include producing a closed-loop turbocharger command in response to the exhaust pressure deviation, producing an open-loop turbocharger command from an input of the exhaust pressure setpoint, and combining the closed-loop and open-loop turbocharger commands to produce a turbocharger command.

According to an illustrative embodiment of a turbocharger closed-loop only control, a method may include determining a boost pressure deviation between a boost pressure setpoint and an actual boost pressure, and producing an exhaust pressure setpoint in response to the boost pressure deviation. The method also may include determining an exhaust pressure deviation between the exhaust pressure setpoint and an exhaust pressure estimate that is estimated from actual cylinder pressure, and producing a turbocharger command in response to the exhaust pressure deviation.

The engine system, or a portion thereof, disclosed herein may include a control system to receive and process input the various sensor in light of stored instructions and/or data, and transmit output signals various actuators including the turbocharger device 312. The control system may include, for example, an electrical circuit, an electronic circuit or chip, and/or a computer. In an illustrative computer embodiment, the control system generally may include one or more processors, memory devices that may be coupled to the processor(s), and one or more interfaces coupling the processor(s) to one or more other devices. Although not shown, the processor(s) and other powered system devices may be supplied with electricity by a power supply, for example, one or more batteries, fuel cells, or the like.

The processor may execute instructions that provide at least some of the functionality for the disclosed system and methods. As used herein, the term instructions may include, for example, control logic, computer software and/or firmware, programmable instructions, or other suitable instructions. The processor may include, for example, one or more microprocessors, microcontrollers, application specific integrated circuits, programmable logic devices, field programmable gate arrays, and/or any other suitable type of electronic processing device(s).

Also, the memory device may be configured to provide storage for data received by or loaded to the engine system, and/or for processor-executable instructions. The data and/or instructions may be stored, for example, as look-up tables, formulas, algorithms, maps, models, and/or any other suitable format. The memory may include, for example, RAM, ROM, EPROM, and/or any other suitable type of storage article and/or device.

Further, the interfaces may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, CAN, MOST, LIN, FlexRay, and/or any other suitable protocol(s). The interfaces may include circuits, software, firmware, or any other device to assist or enable the controller in communicating with other devices.

The method or parts thereof may be implemented in a computer program product including instructions carried on a computer readable medium for use by one or more processors of one or more computers to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one computer or on multiple computers in communication with one another.

The program(s) can be embodied on computer readable media, which can include one or more storage devices, articles of manufacture, or the like. Illustrative computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method may be at least partially performed by any electronic articles and/or devices capable of executing instructions corresponding to one or more steps of the disclosed methods.

Although embodiments and components or acts may be described herein in specific illustrative arrangements and/or combination the scope of the invention includes any combination of such components and acts.

The following is a description of select embodiments (which include reference numbers) are within the scope of the invention. However, the invention is not limited to the specific embodiments described hereafter, and each embodiment may be used alone or in any combination with any other embodiment(s) or elements thereof.

Embodiment 1 may include a method including sensing pressure within an engine cylinder; estimating exhaust pressure based on the sensed pressure within the engine cylinder; and controlling turbocharger boost pressure based on the estimated exhaust pressure.

Embodiment 2 may include a method as set forth in embodiment 1 wherein the exhaust pressure is formulaically estimated using the following equation:

$$P_{exhaust}=f(P_{cyl\_max}, P_{cyl}(\theta), v)$$

where:
$P_{exhaust}$=exhaust manifold pressure;
$P_{cyl}$=cylinder pressure before combustion, after compression;
$P_{cyl\_max}$=maximum cylinder pressure over the current combustion cycle;
$\theta$=exhaust valve opening angle;
$P_{cyl}(\theta)$=cylinder pressure when the engine is in the position where the exhaust valves are open; and
$v$=engine revolutions per minute.

Embodiment 3 may include a process as set forth in one or more of embodiments 1-2 wherein the estimated exhaust pressure is exhaust pressure at a turbocharger turbine inlet.

Embodiment 4 may include a method of designing an engine system, including: providing an engine system including one or more engine cylinder pressure sensors and one or more other engine system sensors; operating the engine system; sensing engine cylinder pressure using the engine cylinder pressure sensors, which are in communication with an engine cylinder of an engine of the engine system; sensing exhaust pressure at a turbocharger turbine inlet using the other engine system sensors; correlating the engine cylinder pressure to the exhaust pressure; and using engine cylinder pressure to replace or augment the exhaust pressure.

Embodiment 5 may include a method as set forth in embodiment 4 wherein the one or more other engine system sensors includes an exhaust pressure sensor to measure the exhaust pressure.

Embodiment 6 may include a method including: determining a boost pressure deviation between a boost pressure setpoint and an actual boost pressure; producing a closed-loop exhaust pressure setpoint adjustment in response to the boost pressure deviation; producing an open-loop exhaust pressure setpoint from inputs of the boost pressure setpoint and an exhaust gas recirculation parameter; combining the closed-loop exhaust pressure setpoint adjustment with the open-loop exhaust pressure setpoint to produce an exhaust pressure setpoint; determining an exhaust pressure deviation between the exhaust pressure setpoint and an exhaust pressure estimate that is estimated from actual cylinder pressure; producing a closed-loop turbocharger command adjustment in response to the exhaust pressure deviation; producing an open-loop turbocharger command from an input of the exhaust pressure setpoint; and combining the closed-loop turbocharger adjustment with the open-loop turbocharger command to produce a turbocharger command.

Embodiment 7 may include a method as set forth in embodiment 6, and further including sensing cylinder pressure in an engine combustion chamber to provide the actual cylinder pressure; and sensing turbocharger boost pressure to provide the actual boost pressure.

Embodiment 8 may include a method including determining a boost pressure deviation between a boost pressure setpoint and an actual boost pressure; producing an exhaust pressure setpoint in response to the boost pressure deviation; determining an exhaust pressure deviation between the exhaust pressure setpoint and an exhaust pressure estimate that is estimated from actual cylinder pressure and producing a turbocharger command in response to the exhaust pressure deviation.

Embodiment 9 may include a method as set forth in embodiment 8, and further including sensing cylinder pressure in an engine combustion chamber to provide the actual cylinder pressure; and sensing turbocharger boost pressure to provide the actual boost pressure.

Embodiment 10 may include a method as set forth in embodiment 8, wherein the step of producing an exhaust pressure setpoint includes using an exhaust pressure closed-loop controller, and the step of producing a turbocharger command includes using a boost pressure closed-loop controller.

Embodiment 11 may include a computer program product including a computer-readable medium including instructions executable by a computer-controlled engine system to cause the system to implement a method according to any one of the preceding embodiments.

Embodiment 12 may include a product, including at least one engine cylinder pressure sensor to measure engine cylinder pressure; at least one turbocharger boost pressure sensor to measure turbocharger boost pressure; at least one memory device storing program instructions and data; at least one control system coupled to the sensors and memory and responsive to the program instructions for causing the computer-controlled system to perform a method according to any one of embodiments 1 through 11

Embodiment 13 may include a product as set forth in embodiment 12, wherein the at least one control system includes a boost pressure closed-loop controller, and an exhaust pressure closed-loop controller.

Embodiment 14 may include a product as set forth in embodiment 13, wherein the at least one control system is a dual control system also including a boost pressure open-loop controller, and an exhaust pressure open-loop controller.

The above description of embodiments of the invention is merely illustrative in nature and, thus, variations thereof are not to be regarded as a departure from the spirit and scope of the invention.

What is claimed is:

1. A method comprising:
sensing pressure within an engine cylinder;
estimating exhaust pressure based on the sensed pressure within the engine cylinder; and
controlling turbocharger boost pressure based on the estimated exhaust pressure;
wherein the exhaust pressure is formulaically estimated using the following equation:

$$P_{exhaust}=f(P_{cyl\_max}, P_{cyl}(\theta), v)$$

where:
$P_{exhaust}$=exhaust manifold pressure;
$P_{cyl}$=cylinder pressure before combustion, after compression;
$P_{cyl\_max}$=maximum cylinder pressure over the current combustion cycle;
$\theta$=exhaust valve opening angle;
$P_{cyl}(\theta)$=cylinder pressure when the engine is in the position where the exhaust valves are open; and
$v$=engine revolutions per minute.

2. The method of claim 1, wherein the estimated exhaust pressure is exhaust pressure at a turbocharger turbine inlet.

3. A method as set forth in claim 1 further comprising using a computer program to implement the method.

4. A product, comprising:
at least one engine cylinder pressure sensor to measure engine cylinder pressure;
at least one turbocharger boost pressure sensor to measure turbocharger boost pressure;
at least one memory device storing program instructions and data;
at least one control system coupled to the sensors and memory and responsive to the program instructions for causing the computer-controlled system to perform a method according to claim 1.

5. The product of claim 4, wherein the at least one control system includes a boost pressure closed-loop controller, and an exhaust pressure closed-loop controller.

6. The product of claim 5, wherein the at least one control system is a dual control system also including a boost pressure open-loop controller, and an exhaust pressure open-loop controller.

7. A method comprising:
determining a boost pressure deviation between a boost pressure setpoint and an actual boost pressure;
producing an exhaust pressure setpoint in response to the boost pressure deviation;
determining an exhaust pressure deviation between the exhaust pressure setpoint and an exhaust pressure estimate that is estimated from actual cylinder pressure; and
producing a turbocharger command in response to the exhaust pressure deviation;
wherein the exhaust pressure is formulaically estimated using the following equation:

$$P_{exhaust}=f(P_{cyl\_max}, P_{cyl}(\theta), v)$$

where:
$P_{exhaust}$=exhaust manifold pressure;
$P_{cyl}$=cylinder pressure before combustion, after compression;
$P_{cyl\_max}$=maximum cylinder pressure over the current combustion cycle;
$\theta$=exhaust valve opening angle;
$P_{cyl}(\theta)$=cylinder pressure when the engine is in the position where the exhaust valves are open; and
$v$=engine revolutions per minute.

8. A method as set forth in claim 7, further comprising:
sensing cylinder pressure in an engine combustion chamber to provide the actual cylinder pressure; and
sensing turbocharger boost pressure to provide the actual boost pressure.

9. A method as set forth in claim 8, wherein the step of producing an exhaust pressure setpoint includes using an exhaust pressure closed-loop controller, and the step of producing a turbocharger command includes using a boost pressure closed-loop controller.

10. A method comprising:
determining a boost pressure deviation between a boost pressure setpoint and an actual boost pressure;
producing a closed-loop exhaust pressure setpoint adjustment in response to the boost pressure deviation;
producing an open-loop exhaust pressure setpoint from inputs of the boost pressure setpoint and an exhaust gas recirculation parameter;
combining the closed-loop exhaust pressure setpoint adjustment with the open-loop exhaust pressure setpoint to produce an exhaust pressure setpoint;
detrmining an exhaust pressure deviation between the exhaust pressure setpoint and an exhaust pressure estimate that is estimated from actual cylinder pressure;
producing a closed-loop turbocharger command adjustment in response to the exhaust pressure deviation;
producing an open-loop turbocharger command from an input of the exhaust pressure setpoint; and
combining the closed-loop turbocharger adjustment with the open-loop turbocharger command to produce a turbocharger command.

11. A method as set forth in claim 10, further comprising:
sensing cylinder pressure in an engine combustion chamber to provide the actual cylinder pressure; and
sensing turbocharger boost pressure to provide the actual boost pressure.

* * * * *